United States Patent
Griffioen (10) Patent No.: US 8,374,471 B2
(45) Date of Patent: Feb. 12, 2013

(54) CABLE, AND A NETWORK AND THE USE OF SUCH A CABLE

(75) Inventor: Willem Griffioen, Ter Aar (NL)

(73) Assignee: Draka Comteq B.V. (NL)

( * ) Notice: Subject to any disclaimer, the term of this patent is extended or adjusted under 35 U.S.C. 154(b) by 476 days.

(21) Appl. No.: 12/602,060

(22) PCT Filed: May 30, 2008

(86) PCT No.: PCT/NL2008/050330
§ 371 (c)(1),
(2), (4) Date: Feb. 9, 2010

(87) PCT Pub. No.: WO2008/147194
PCT Pub. Date: Dec. 4, 2008

(65) Prior Publication Data
US 2010/0158456 A1 Jun. 24, 2010

(30) Foreign Application Priority Data
May 31, 2007 (NL) ...................................... 1033919

(51) Int. Cl.
*G02B 6/44* (2006.01)
(52) U.S. Cl. ........................................ 385/100; 385/104
(58) Field of Classification Search .................... 385/100
See application file for complete search history.

(56) References Cited

U.S. PATENT DOCUMENTS

| 4,146,302 | A |   | 3/1979  | Jachimowicz |
|-----------|---|---|---------|-------------|
| 4,381,140 | A | * | 4/1983  | van der Hoek et al. ........ 385/104 |
| 4,828,352 | A |   | 5/1989  | Kraft |
| 5,809,194 | A | * | 9/1998  | Lovie ............................. 385/104 |
| 6,795,625 | B1|   | 9/2004  | Ishii et al. |
| 7,123,801 | B2|   | 10/2006 | Fitz |
| 7,460,753 | B2| * | 12/2008 | Kewitsch ...................... 385/113 |

FOREIGN PATENT DOCUMENTS

| GB | 1 506 967   | 4/1978 |
| JP | 63 201611 A | 8/1988 |
| JP | 9117953 A   | 5/1997 |

OTHER PUBLICATIONS

International Search Report for PCT/NL2008/050330 dated Sep. 18, 2008.

* cited by examiner

*Primary Examiner* — Omar Rojas
(74) *Attorney, Agent, or Firm* — Leydig, Voit & Mayer, Ltd.

(57) ABSTRACT

A cable, comprising a cylindrical cable wall (2) surrounding a hollow cable inner space (3), wherein the cable (1) is provided with at least one signal conductor (5), for instance glass fiber and/or glass fiber bundle, wherein, in a first position, the signal conductor (5) extends substantially in the cable inner space (3) and over a particular distance along the cable wall (2), along an at least partly curved path, such that a length of the signal conductor (5) is larger than a length of the cable wall (2).

20 Claims, 4 Drawing Sheets

CABLE, AND A NETWORK AND THE USE OF SUCH A CABLE

FIELD OF THE INVENTION

The invention relates to a cable, and a network and the use of such a cable.

BACKGROUND

Constructing cable networks for the purpose of signal transmission, for instance glass fiber networks, typically involves combining optical glass fibers from different parts of the network. This is relatively difficult, since glass fibers can break during such an operation. In addition, typically, a minimum distance of about 20 meters is used between two nodes in a glass fiber network due to optical requirements (in particular regarding noise), so that a conductor repair length needs to have this minimum length.

Welding optical fibers is a critical process which requires a clean environment. Usually, coupling is done aboveground (for instance outside a channel or trench in which the cable has been laid). It is known to install extra cable length to this end. A drawback is that it is then necessary that this extra cable length is installed at the right location, at least there where, for instance, a branch needs to be made.

From the prior art, for instance, a cable is known which is provided with a so-called SZ-stranded cable, where the wire winding direction is periodically inverted to create extra glass fiber length, see for instance U.S. Pat. No. 6,795,625 B1, with the purpose to be able to compensate for thermal and mechanical length variations of the cable. In this case, the extra glass fiber length can only be used to be able to reach glass fibers easily to take them out (without disturbing or even cutting other glass fibers) and the required length of glass fiber is obtained by opening a relatively long part of the cable.

JP63201611 describes a flat body with a narrow slot in which an optical fiber is received.

U.S. Pat. No. 4,146,302 describes a communication cable, where helically wound optical fibers are provided in a tube, to avoid mechanical stress in the fibers. Axial lengthening of the tube results in deformation (extension) of the helix.

SUMMARY OF THE INVENTION

The present invention contemplates providing a solution for the above-described problems. In particular, the invention contemplates an improved cable which enables a relatively efficient, cost-reducing and reliable cable installation.

According to the present invention, this object is achieved by a cable, comprising a cable wall surrounding a hollow cable inner space, wherein the cable is provided with at least one signal conductor, for instance glass fiber and/or glass fiber bundle, wherein, in a first position, the signal conductor extends substantially in the cable inner space and over a particular distance along the cable wall, along an at least partly curved path, such that a length of the signal conductor is larger than a length of the cable wall. Preferably, the cable comprises a substantially cylindrical cable wall.

This cable, which can in fact comprise a hollow tube, can contain a relatively long signal conductor and hold it in itself in the first position. The cable and its one or more conductors form, for instance, an assembly which can be installed at the same time, for instance in the ground or another desired installing position.

It is noted that JP09117953 describes an extrusion process, where spiral-shaped grooves or projections are formed.

According to paragraph 28, a spacer ("fluting groove") for optical fibers is provided on an outside, by a head C shown in FIG. 7 of this document.

Preferably, the cable is configured to provide extra signal conductor length, for the purpose of taking a part of the conductor out of the cable. Extra signal conductor length (which is stored in the cable) may, for instance, simply be used after laying the cable, for the purpose of constructing a cable network, to realize couplings with other network parts. One or more relatively long parts of the signal conductor may, for instance, be pulled from the cable at one or more desired locations for the purpose of connection, without large parts of the cable wall needing to be removed for that purpose. A taken-out conductor part may, for instance, be connected to signal-receiving and/or signal-transmitting means. These signal-receiving and/or signal-transmitting means may comprise, for instance, one or more other signal conductors, signal transmitters, receivers, processors, network parts, coupling means and/or other signal-receiving and/or signal-transmitting means.

According to a further elaboration, a helix layer, and possibly also a SZ-spiraled layer, of signal conductors is stably positioned against an inner wall of the cable (i.e. tube). The production of such a cable is relatively simple and, in addition, saves space and material.

According to an advantageous elaboration, the signal conductors may, for instance, be positioned against the (inner) cable wall in close stacking in curved paths, for instance paths comprising one or more helical or SZ-spiraled path sections. Close stacking is particularly understood to mean: such a close stacking that tangential interspaces between signal conductors all added together have a dimension (cumulative interspace) of the order of the diameter of a signal conductor. With a cumulative interspace which is only a fraction of the diameter of the signal conductors, the signal conductors already remain lying stable against the cable wall without a curve. However, this is not essential. Due to the curved paths of the signal conductors, the signal conductors also remain lying against the cable wall with a larger cumulative interspace.

Preferably, the above-mentioned close stacking is such that it is avoided that the signal conductors become stuck (and cannot be pulled out of the curved paths without disturbing the stacking of the other signal conductors). Preferably, a relatively small tangential space/play between the signal conductors is used, to be able to compensate for differences in thermal shrinkage, without the signal conductors becoming under such large cross pressure that signal damping occurs in the signal conductor.

According to an advantageous elaboration, on the inside, the cable wall may be provided with a structure to engage above-mentioned at least one signal conductor when the signal conductor is in the first position, in particular prevent tangential displacement of the signal conductor—viewed with respect to a cable centerline—on site.

Thus, the cable wall may, for instance, be provided with at least one groove (e.g. longitudinal groove) to receive the part of the above-mentioned signal conductor extending along the wall in the above-mentioned first position. Here, a length of the groove may, for instance, be equal to the length of the signal conductor to be received by the groove. Further, the groove may, for instance, be provided with a number of bends, to keep the signal conductor in a number of bends.

Good results are achieved if above-mentioned groove extends along a spiral-shaped path, or along a path provided with one or more spiral-shaped path sections, and preferably along a path with a periodically changing anti-clockwise and clockwise spiral direction.

According to an advantageous embodiment, the cable wall is arranged to be opened at least one desired position to reach the signal conductor and partly take it out of the cable.

Preferably, the signal conductor is bringable (from an above-mentioned first position) to a second position (for instance by pulling a part of the signal conductor out of the cable), in which second position, the conductor part extending in the cable inner space is shorter than the conductor part extending in the cable inner space in the first position. In particular, at least the part of the signal conductor which extends over a particular distance along a curved path in the first position, extends along a less curved path in the second conductor position, for instance parallel with respect to a centerline of the respective cable inner space.

In one exemplary embodiment, an inner diameter of the cable wall comprises at least ten times a conductor cross dimension.

In addition, the length of the signal conductor may be at least 1% larger than a length of the cable wall, and preferably at least 2%, in particular at least 4% and more in particular at least 10%.

Preferably, a conductor take-out part can be taken (pulled) out of the inner space of the cable, while at least a part of the cable contains extra conductor length to provide above-mentioned conductor take-out part, while the extra conductor length is at least 1% of a length of the cable part containing this extra conductor length, preferably more than 2%, in particular more than 4% and more in particular more than 10%.

According to one embodiment, a minimal bending radius of a part of the signal conductor located in the cable is 20 mm, in particular 15 mm, and more in particular 10 mm. The cable configuration is preferably such that a conductor part can pulled out of the cable with a length of at least 1 m, preferably at least 10 m.

It is further advantageous when a part of the conductor still extends over the whole length of the cable inner space, in the cable inner space (for instance between two cable end faces), after another part of the conductor has been taken out of the cable (through a relatively small cable wall opening).

In addition, the invention provides a cable network provided with at least one cable according to the invention, where at least one above-mentioned signal conductor of the cable forms a signal-transmitting connection between different network parts. By use of above-mentioned cable, the network can be installed relatively quickly and efficiently.

An underlying thought of the invention is the integration of a traditional tube with a cable, where in particular internal grooves are used to receive the conductors. The present cable can protect the conductors like a tube, and is widely applicable with regard to making branches. Therefore, in the present application, the terms 'cable' and 'tube' are interchangeable. Thus, the cable may comprise a hollow tube, for instance provided with internal spiral grooves or other internal engaging means which can keep signal conductors along the tube wall. The signal conductors may, for instance, comprise optical fibers or fiber bundles. Use of reinforcing parts or filling material is not necessary.

The cable may be designed such that each signal conductor can be pulled out of a respective cable wall inner groove, for instance to a straight position (at least, straight with respect to a corresponding part of the cable), and can then, for instance, slide over the tops of ribs extending between the grooves.

According to one elaboration of the invention, conductor parts with lengths of tens of meters can be pulled out of the cable, preferably at a desired location along the cable wall. In the case of an above-mentioned SZ-configuration, with periodically inversed helical winding direction, viewed in a cable longitudinal direction, the different signal conductor can independently slide along one another. Further, the present cable can simply be manufactured in a one-step extrusion process. In addition, the cable can protect the conductors, for instance like a tube can protect a cable.

An advantage of various aspects of the invention is that long conductor parts can be taken out of the cable and can be coupled at a distance of one or more meters from an opening made in the cable, or can even reach desired final locations without such a coupling being necessary.

Further elaborations of the invention are described in the subclaims.

BRIEF DESCRIPTION OF THE DRAWINGS

The invention will now be described with reference to the different exemplary embodiments and the drawing, in which.

In this application, same or corresponding measures are designated by same or corresponding reference symbols.

DETAILED DESCRIPTION OF THE DRAWINGS

Figure 1:
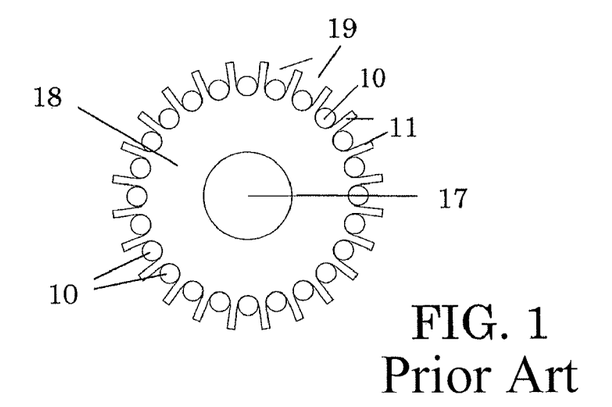
FIG. 1 shows a cross section of a cable core known from the prior art.

FIG. 1 shows a desired cross section of a traditional SZ-stranded cable core (analogous to the one according to U.S. Pat. No. 6,795,625 B1) which is provided with grooves or slots 19 on the outside, and in particular consists of a central reinforcing part 17, on which a spacer 18 is provided which is provided with the grooves 19 on its outside to receive signal conductors 10. The grooves 19 are separated from one another by means of ribs 11. The configuration is such that the conductors 10 successively follow spiral paths in different directions (at least helical path sections provided with intermediate inversion curves), according to the SZ-configuration, as is generally known to a skilled person. Such a core is usually manufactured by means of extrusion.

Figures 2A, 2B:
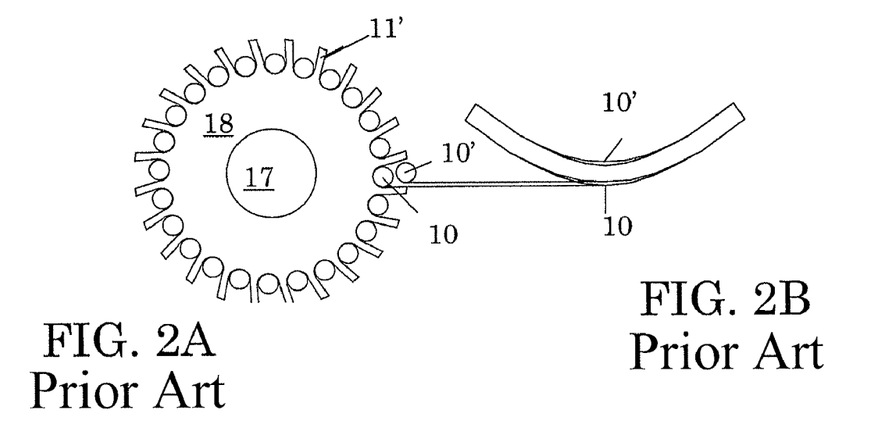
FIG. 2A shows a cross section similar to FIG. 1, where a rib deformation is shown.
FIG. 2B shows a schematic side elevational view of a part of the embodiment shown in FIG. 2A.

A drawback of the traditional cable core with above-mentioned SZ-configuration is that, in practice, the desired shape shown in FIG. 1 will not be achieved at the inversion points, but the shape shown in FIG. 2A, as a result of thermal shrinkage during extrusion. In particular, a rib deformation is found to occur as a result of the ribs shrinking in longitudinal direction after cooling down with extrusion (which does not occur with spacers wound in a direction). FIGS. 2A, 2B show the result of such a deformation, comprising inward deformation of the ribs 11', towards the inside of the inversion curve. This short-circuiting of the inversion curve is particularly critical for thin ribs (see U.S. Pat. No. 6,795,625).

FIG. 2B schematically shows a longitudinal view of the signal conductor in one of the grooves 19, of the embodiment shown in FIG. 2A. When the conductor 10 moves radially outwards out of the groove to the position designated by 10', the conductor will find a shorter path in the short-circuited inversion curve. This reduces the extra length of the signal conductor, which makes the respective cable less resistant to tensile forces and temperature variations.

Figure 3:
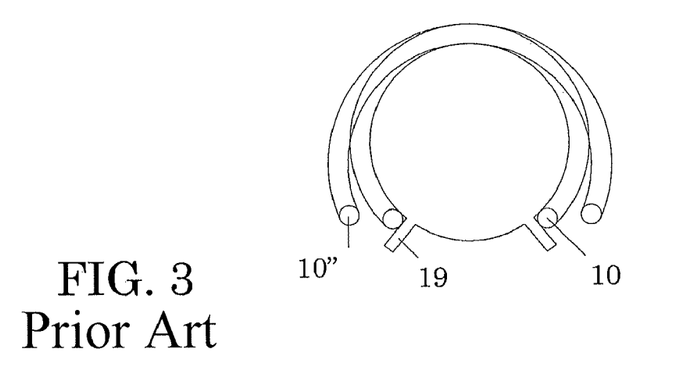
FIG. 3 shows a schematic cross section along a 275°-degree SZ-strand of a part of the cable core known from the prior art, where ribs are shown at inversion points.

Another drawback of the traditional cable is that the signal conductor 10 can move freely out of the cable core. This follows from FIG. 3, which shows a schematic cross section along one 275° strand part of a signal conductor of the traditional cable core with SZ-winding configuration, where ribs 11 are shown at the inversion point. The signal conductor 10 tends to move out of the groove 19 as a result of an inherent spring action, to the position designated by reference symbol 10". This movement needs to be blocked by means of extra tape (not shown) provided around the core and signal conductors.

Figure 4:
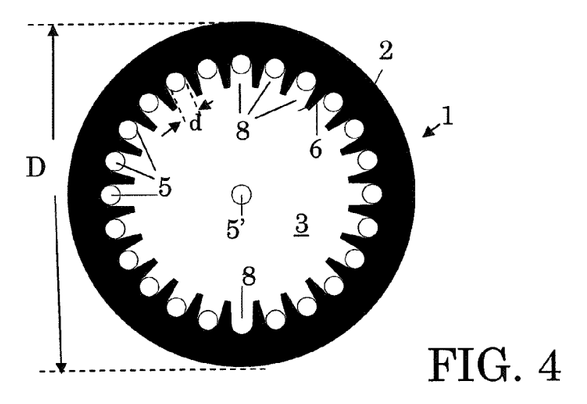
FIG. 4 shows a cross section of a first exemplary embodiment of the invention.

FIG. 4 shows a cross section (at right angles to the cable longitudinal direction) of an exemplary embodiment of a cable 1 according to the invention. The cable comprises an elongated cable wall 2 surrounding an elongated cable inner space 3. In the exemplary embodiment, the cable wall 2 has a cylindrical design, concentric with respect to a longitudinal cable centerline, with a substantially circular outer contour viewed in cross section. The cable 1 is provided with at least one signal conductor 5, several (in particular at least ten) in the present example. In particular, the conductors 5 are each confined in the cable inner space 3 in a respective first position. In the first position, the (preferably each) signal conductor 5 can extend substantially in the cable inner space 3 and over a particular distance along the inside of the cable wall 2, along an at least partly curved path (at least curved with respect to a longitudinal direction of the cable wall). A length of the signal conductor 5, measured in signal conductor longitudinal direction, is preferably larger than a length of the cable wall 2 (measured in longitudinal direction of the cable 1 between cable end faces P1, P2, see FIG. 9). In this manner, the cable forms a tube in which one or more relatively long signal conductors 5 (at least longer than the tube itself) are stored.

According to one embodiment, the part of the signal conductor (for instance the whole signal conductor) extending over a particular distance along the cable wall 2 (along an at least partly curved path with respect to the cable wall) wholly abuts this cable wall in the respective first position (as shown in FIG. 4).

Preferably, in above-mentioned first position, this part of the signal conductor 5 can extend at a relatively short distance, e.g. a distance of less than 1 mm and preferably a distance of about 0.1 mm or less, from an inside of the cable wall 2, along the cable wall. In particular, there is such a play between this signal conductor 5 in the first position and the cable wall 2 that this enables mechanical and thermal length variations of cable wall length with respect to the conductor to be compensated for.

In the exemplary embodiment, the cable wall 2 is advantageously provided with a structure (e.g. relief) 6, 8 on the inside, which structure comprises several grooves or slots 8 (in particular at least ten) separated from one another by ribs 6, to receive the signal conductors 5 and, for instance, engage them when the signal conductors 5 are in the first position. The structure 6, 8 can prevent tangential displacement of the signal conductor 5—viewed with respect to the longitudinal cable centerline—on site. The structure 6, 8 may, for instance, serve to position the respective signal conductor(s) along the cable inside in an above-mentioned first position. In addition, longitudinal bottoms of the grooves 8 may each serve to prevent or block a particular radially outward displacement of conductor parts 5 extending therein.

The grooves 8 can preferably each receive a part of a respective above-mentioned signal conductor 5 extending along the wall in above-mentioned first position. Further, a length of the groove 8 may be equal to the length of the signal conductor part 5 to be received by the groove. Further, the groove 8 (and each rib 6 located therealong) is preferably provided with a number of bends, to keep at least a part of the respective signal conductor 5 in a number of bends.

Figures 5A, 5B:
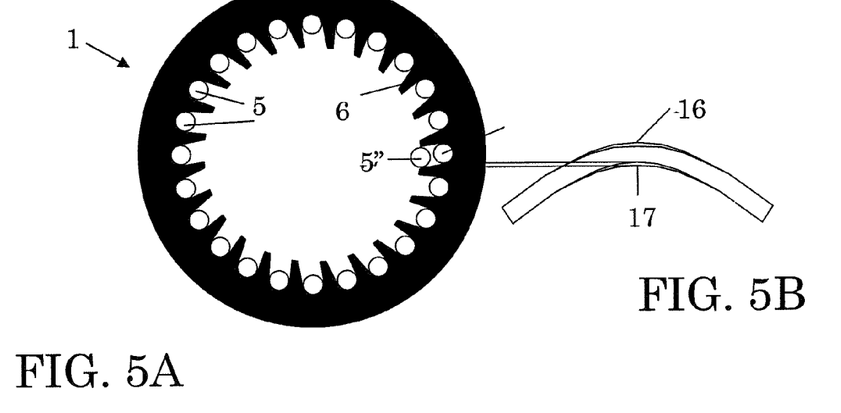
FIG. 5A shows a cross section similar to FIG. 4, where a rib deformation is shown.
FIG. 5B shows a schematic side elevational view of a part of the embodiment shown in FIG. 5A.

A radial depth of each groove 8 (viewed with respect to the longitudinal cable centerline) may, for instance, be at least equal to or larger than a cross dimension (e.g. diameter) of a signal conductor 5 to be received by the groove (see FIG. 4); this is not essential, however. A tangential width of each groove 8 may, for instance, be approximately equal to a cross dimension (e.g. diameter) of a signal conductor 5 to be received by the groove, or slightly larger. Each groove may comprise different shapes, viewed in cross section, for instance U-shaped (like in FIG. 5), or angular, V-shaped, or otherwise. Preferably, the groove 8 is designed such that a signal conductor part 5 extending therein is free to move from the groove in a radially inward direction, at least if the respective signal conductor 5 is operated or actuated to this end, in particular during pulling a respective conductor part of this signal conductor out of the cable, see below. Likewise, each rib 6 may comprise different shapes, viewed in cross section, for instance U-shaped, or angular, V-shaped or otherwise. Each rib 6 may, for instance, comprise a substantially continuous rib 6, or a non-continuous rib 6 (for instance broken at particular positions), viewed in rib longitudinal direction.

Thus, each above-mentioned groove 8 (and rib 6) can preferably extend along a spiral-shaped path. It is extra advantageous when each groove 8 extends along a path provided with one or more spiral-shaped path sections, and preferably along a path with a periodically inverted anti-clockwise and clockwise spiral direction. In the exemplary embodiment, the grooves 8 (and respective ribs 6) form an SZ-configuration with periodically inverted spiral winding direction (viewed in longitudinal direction of the cable) provided on the cable inside, to keep the signal conductors 5 in such a SZ-configuration as well.

According to a further, advantageous elaboration, the structure 6, 8, which is arranged to receive the signal conductors, can extend over the whole length of the cable 1; this is not necessary, however. Alternatively, the structure 6, 8 may, for instance, extend over only one or more parts of the cable inside, to locally receive signal conductors 5 along the cable inside. In a same manner, in a respective first position, each above-mentioned signal conductor 5 may extend wholly along the cable inner wall (in direct contact with this wall, or at a very short distance from the this wall), or only partly.

In the exemplary embodiment, each groove 8 can receive only one respective signal conductor 5. Alternatively, each groove 8 can, for instance, receive a limited number of the signal conductors 5 to be accommodated in the cable 1, for instance two or more.

In an advantageous manner, each signal conductor 5 is bringable to a second position 5', in which second position, a conductor part extending (over a particular cable length) in the cable inner space 3 is shorter than a conductor part extending (over the same cable length) in the cable inner space 3 in the first position. A remaining part of the conductor 5 brought into the second position has then preferably been brought outside the cable 1, through a suitable opening 9 in the cable wall 2 (see below).

The cable configuration is preferably such that a conductor part extending in the inner space 3 over a particular cable length (of a particular cable part containing the extra conductor length) is completely available to provide extra conductor take-out length (of an above-mentioned take-out part). After taking out the take-out part, at least a part of the respective conductor 5, which part has provided the extra take-out length, can remain in the inner space 3; the conductor part remaining behind can still extend over the complete respective cable length (of the above-mentioned cable part), in the inner space 3.

As follows from the Figures, the above-mentioned conductor 5 can in particular move at least partly away from the cable wall 2 to the above-mentioned second position, such that, in the second position, the conductor part is spatially separated from (an inside of) the cable wall 2.

In particular, at least a part of the signal conductor 5 which extends along a curved path over a particular distance in the above-mentioned first position, extends along a less curved path in the cable in the second position (at least less curved with respect to the curvature in the first position). In the second position, this conductor part 5 may, for instance, extend substantially parallel with respect to a centerline of the respective cable inner space 3. An above-mentioned second position for one of the conductors is designated by reference symbol 5' in FIG. 4.

According to one embodiment, the conductor part brought to the second position extends at least at a lateral distance from the position assumed by this conductor part in its first position, viewed in a cable cross section (see FIG. 4). Preferably, this distance is at least one conductor cross dimension (e.g. diameter), for instance a distance of at least 1 mm and preferably a distance of about 1 cm or more.

In the exemplary embodiment, in its second position, the signal conductor 5 may, for instance, be completely pulled out of the respective groove 8 and may then extend parallel with respect to centerline of the cable inner space 3. In principle, any radial position is possible as long as the signal conductor remains out of the groove 8.

Figure 9:
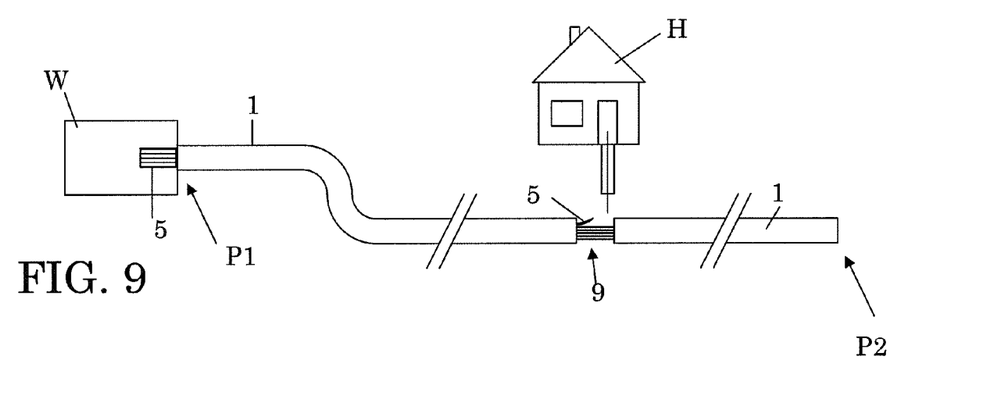
FIG. 9 shows a schematic representation of a step of a method for constructing a network, after opening a cable.
Figure 10:
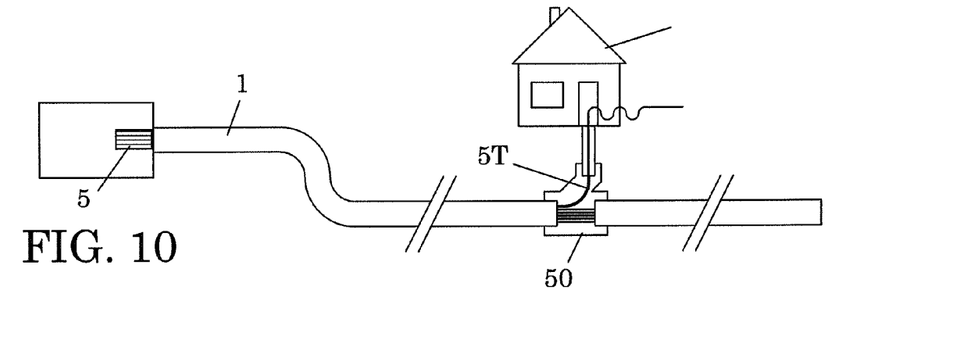
FIG. 10 shows a schematic representation of the method after taking a part of a signal conductor out of the cable.

In the exemplary embodiment of FIG. 4, the cable wall 2 is arranged to be opened at least one desired position (from an environment) (at a distance from cable end faces P1, P2) to reach the signal conductors 5 in the cable and partly take them out of the cable (see also FIGS. 9-10). An opening 9 provided to this end is preferably considerably smaller than a length of a conductor part to be taken out.

A maximum dimension (e.g. cross dimension, length, diameter) of the respective opening 9 may, for instance, be no more than 10%, preferably no more than 1% of a length of the signal conductor part to be taken out.

Preferably, a length of the opening 9 (measured in cable longitudinal direction) is less than 10%, in particular less than 1%, of a length of a signal conductor part 5T to be taken out. A diameter of the opening 9 may, for instance, comprise approximately one time or a few times a cross dimension of the signal conductor 5 to be brought to the second position. In one embodiment, the length of the opening 9 is smaller than 10 cm. Opening the cable wall 2 may, for instance, comprise cutting, peeling, melting open, tearing, material removal and/or another method suitable for this purpose.

Further, the cable wall 2 may, for instance, be provided, at one or more suitable positions, with integral weakening wall parts (for instance with marking), which take relatively little effort to operate to locally open the cable wall. An above-mentioned position is in particular located at a distance from cable end faces P1, P2 (see FIGS. 9-10).

According to a further elaboration, an inner diameter of the cable wall (e.g. measured between bottoms of opposite internal grooves) comprises at least ten times a conductor cross dimension d (see FIG. 4). According to a further elaboration, the length of each signal conductor 5 is at least 1% larger than a length of the cable wall, and preferably at least 2%, in particular at least 4% and more in particular at least 10%. In addition, a bending radius of a part 5 of the signal conductor located in the cable may, for instance, be at least 20 mm, in particular at least 15 mm and more in particular at least 10 mm. Above-mentioned bending radius may, for instance, be approximately equal to or slightly smaller than an inner diameter of the cable inner space 3. Further, it is advantageous when a conductor part with a length of at least 1 m (in particular at least 10 m) can be pulled out of the cable, utilizing moving a respective conductor part of that conductor 5 from the first to the second position. Other dimensions and proportions are also possible.

The cable wall 2 as such may, for instance, be manufactured from different materials, for instance one or more suitable, optionally reinforced plastics, or other materials. Preferably, the cable wall itself has a particular flexibility, such that the cable 1 can be laid in particular bends. Preferably, the cable wall 2 can provide a fluid-tight sealing or sleeve of the cable inner space 3; this is not necessary, however.

The hollow cable inner space 3 may, for instance, be filled with fluid, for instance a gel, and preferably air, gas or gas mixture. Preferably, the hollow inner space of the tube 1 is not filled with a solid filler so that above-mentioned conductors are bringable from above-mentioned first position to above-mentioned second position.

Further, the cable may be provided with leak-stopping means, for instance a swelling means, swelling powder, or the like, arranged to, in case of a leak, automatically stop the leaked substance from spreading further from an environment of the cable in the longitudinal direction of an above-mentioned hollow inner space 3. This is not essential, however.

Each signal conductor 5 may, for instance, comprise one or more signal-conducting wires, glass fiber, a glass fiber bundle, copper wire, or another signal conductor. A signal conductor 5 as such may, for instance, comprise one or more signal conducting cores, provided in a suitable protective casing. The different conductors 5 may, for instance, be provided with markings to be able to distinguish the conductors 5 from one another, e.g. by means of color codes and/or text provided on the conductors 5. An above-mentioned signal conductor 5 may be arranged to conduct one or more optical signals, or to conduct one or more electrical signals. The various signal conductors 5 of the same cable may, for instance, each conduct the same type of signal (e.g. optical) during use. In addition, one or more of the signal conductors 5 may comprise a different type of signal than others of the conductors 5 (for instance for the purpose of transmitting both electrical and optical signals through the same cable). Each signal conductor 5 may be manufactured from one material, or consist of more materials. Each signal conductor 5 may, for instance, have a solid design, and/or is preferably flexible (e.g. with an above-mentioned minimum bending radius).

An outer diameter D of the cable 1 may, for instance, be in the range of approximately 10-50 mm, in particular approximately 10-30 mm, or more than 20 mm, or a different dimension. The same holds for an inner diameter of the cable wall 2. A radial thickness of the cable wall 2, measured between an above-mentioned outer diameter and inner diameter, may for instance be in the range of approximately 1 mm-5 cm, in particular approximately 5 mm, or have a different value. A circumference, e.g. outer diameter d, of an above-mentioned signal conductor 5, may, for instance, be in the range of approximately 0.25 mm-10 mm, in particular have a range of approximately 1-2 mm, or have a different dimension.

According to one example, the embodiment shown in FIG. 4 may comprise a hollow cable tube 1, e.g. with an outer diameter D of 32 mm or a different diameter, and with, for instance, twenty-four internal radially provided grooves or slots 8, in which the signal conductors 5 (for instance with d=1.8 mm diameter or otherwise) may be placed. Preferably, the grooves 8 are spiral grooves 8, for instance in a helix or a reverse lay SZ-spiraling shape). All conductors 5 may, for instance, be pulled out of the grooves 8 to a substantially straight line, as is shown with regard to one of the signal conductors 5' (shown in the middle); however, a signal conductor 5 pulled out of a groove 8 may assume several positions within the hollow cable or tube. In such a second position, the conductor 5 itself may, for instance, be on a bottom of the cable inner space, for instance on tops of lower ribs 6, which face upwards.

In the case of the advantageous SZ-spiraling structure, the conductors 5 may be pulled out independently of one another, away from the cable wall 2, without being wound around one another or becoming entangled. A maximum extra length with use of the SZ-spiral-shaped conductor-lay configuration with respect to the straight line is at least 30% of the length of the cable, for instance between about 30-71% (30% for an advantageous inversion angle of 275° between spiral inversion points, and 71% for an endless inversion angle between these points, i.e. the limit of helical wires), with a minimum conductor bending radius of 20 mm and a cable diameter of 32 mm.

FIG. 5A is a view similar to FIG. 2A, and relates to the embodiment shown in FIG. 4. When a signal conductor 5 moves out of the respective groove (now radially inwards) to the position designated by 5", the signal conductor will find a relatively shorter path length in the short-circuited inversion curve. This actually increases the extra length of the signal conductor, which extra length is the result of the inward movement of the signal conductor. This makes the cable of the present exemplary embodiment more resistant to length variations as a result of mechanical forces and temperature variations.

Figure 6:
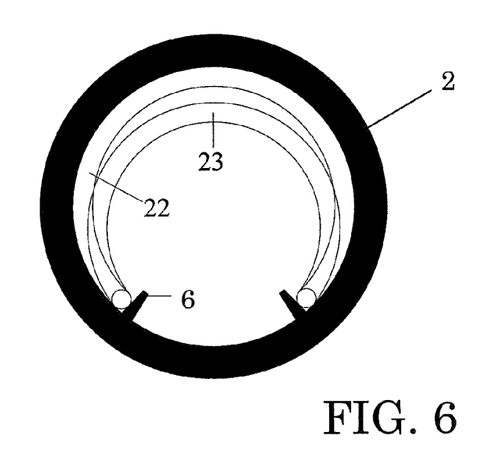
FIG. 6 shows a schematic cross section along a 275-degree SZ-strand of a signal conductor of the exemplary embodiment shown in FIG. 4, where ribs are shown at inversion points.

FIG. 6 shows a schematic cross section along one 275° strand of the signal conductor of the embodiment according to FIG. 4 (SZ-stranded), where ribs 6 are shown at inversion points. In this case as well, the conductor 5 tends to move outwards out of the respective groove as a result of inherent spring action. However, in this case, the conductor 5 cannot move freely to the cable inner space as a result of the length of the cable conductor, which length should be smaller for this purpose (which is designated by reference symbol 23). The present exemplary embodiment needs no extra measures, such as tape or string, to keep the conductors 5 in a desired position in the cable.

The present cable embodiment 1 further has the advantage that use of reinforcing parts with low coefficients of thermal expansion or other special materials can be avoided, which is cost-effective. The exemplary embodiment can be manufactured relatively simply in one extrusion step and has no central core, in contrast with traditional cables which are provided with a core with external grooves or stranded tubes. In addition, in the exemplary embodiment 1, no extra tape or the like needs to be used to block the tendency of the conductors to move outwards.

Figure 7:
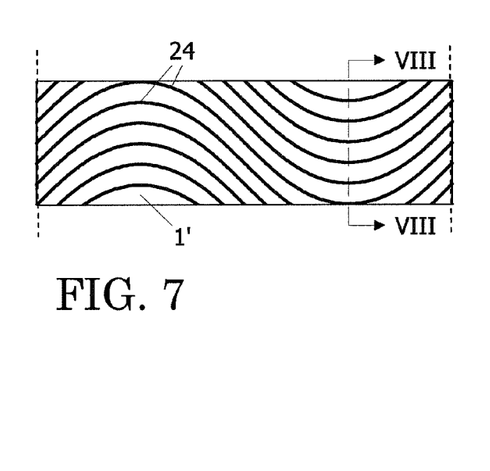
FIG. 7 shows an example of a second embodiment according to the present invention, in side elevational view.
Figure 8:
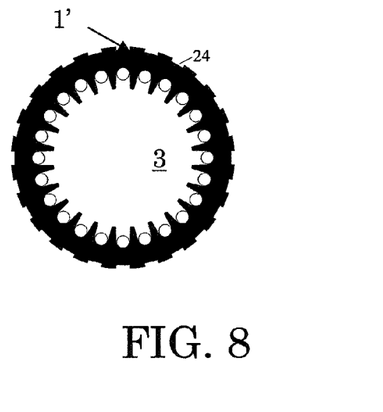
FIG. 8 shows a cross section along line VIII-VIII of FIG. 7.

FIGS. 7 and 8 show a second exemplary embodiment of a cable 1', which differs from the example 1 shown in FIG. 4 in that the outside of the cable wall is provided with indicators or marking means 24 to mark locations of cable conductors 5 extending in the inner space. In particular, these indicators 24 can indicate the positions of the internal grooves, and are, to this end, for instance provided opposite the internal grooves 8 (alternatively, indicators 24 may, for instance, indicate the positions of internal ribs 6). The indicators may, for instance, comprise external grooves, or be designed in a different manner. The indicators may, for instance, be used to make a small passage in the cable at a desired position, to reach one or more signal conductors located in the cable 1', for instance for the purpose of branch purposes. By varying the size and shape of two or more of such external grooves, all positions can be defined and be found, for instance by means of counting.

Another possibility is to provide the outside of the cable with a color code, for instance printed or by means of co-extrusion, to mark positions of the internal grooves. The marking means may also be designed in a different manner, and comprise, for instance, weakening structures or the like to facilitate local opening of the cable wall.

Figure 11:
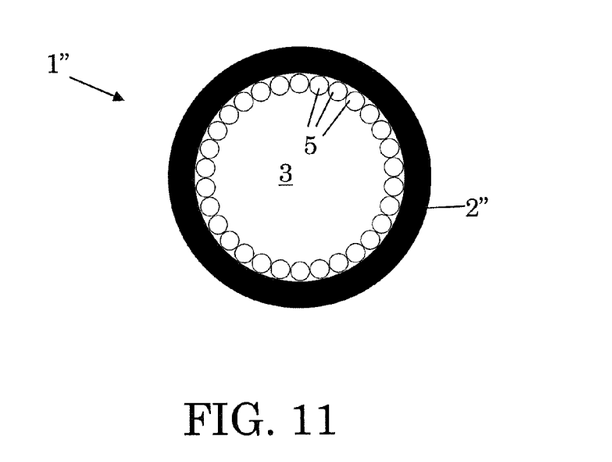
FIG. 11 shows a cross section similar to FIG. 4 of a further advantageous embodiment of the invention.

FIG. 11 shows an advantageous exemplary embodiment 1", which differs from the configurations shown in FIGS. 4-8 in that the cable 1" is provided with signal conductors 5 (separate, in themselves not directly fixed to one another), which substantially extend in the cable inner space 3 in the first position, in a close stacking, in curved paths. In particular, the signal conductors 5 abut one another, viewed in cable circumferential direction, against the (in this example cylindrical) inside of the cable wall 2". In this case, the inside 2" is not provided with a structure (for instance internal grooves) to engage the signal conductor, but, for instance, has a smooth design. As mentioned in the above, the signal conductors 5 may, for instance, stably abut the cable inner wall, for instance in a helical layer, or a SZ-spiraled layer. Optionally, a single (or two or a few) rib(s) may be located on the inside of cable wall 2" (not shown), for instance at the location of a (or two or a few of the) signal conductor(s) to keep the SZ-spiraled layer "in shape". Preferably, the embodiment shown in FIG. 11 is configured such that differences in thermal shrinkage can be compensated for, for instance by use of a relatively small tangential play between the signal conductors.

In the embodiment according to FIG. 11, one layer of conductors 5 is laid against the cable inside in a close stacking. Alternatively, for instance, several (i.e. two or more) layers of conductors 5 may be laid against the cable inside in a closed stacking in curved paths.

FIGS. 9-10 schematically show a use of a cable 1 according to the invention, which cable 1 is, for instance, designed according to the above-described measures (see for instance FIGS. 4-8, 11). The cable 1 may, for instance, be positioned first, for the purpose of constructing a cable network, to then be branched to connect one or more end users H to another part of a network. Here, the cable 1 may, for instance, be laid in the ground, at a safe depth.

A difference in length between one or more signal conductors 5 located in the cable 1 and the cable wall 2 of this cable is preferably used to take a part of the respective signal conductor(s) out of the inner space of the cable (through a suitable opening 9 made in the cable wall 2), which conductor part is then, for instance, connected to signal-receiving and/or signal-transmitting means.

The cable branching shown in FIGS. 9-10 can be carried out by locally opening the cable wall 2 (tube wall) at a desired position and partly pulling the desired signal conductor 5 out of the thus obtained, relatively small opening 9. A pulled-out conductor part 5T may then, for instance, be introduced into a protective branch unit, for instance utilizing a Y-branch connector 50 (for instance as described in U.S. Pat. No. 6,619,697). A remaining part of the signal conductor 5 staying behind in the cable preferably still extends from the one cable end face P1 to the other cable end face P2. This remaining part is, at least for the part of the cable over which the taken-out length of signal conductor has been pulled out, in particular in an above-mentioned second position, and may, for instance, follow a substantially less curved or a substantially straight line through the hollow cable (at least parallel to the cable), preferably without making contact with other signal conductors located in the cable which are still in respective first positions.

In this manner, a relatively long part 5T of a signal conductor can be pulled out of the cable 1, at a distance from cable end faces P1, P2, without the signal conductor 5 needing to be subjected to a relatively large mechanical load. In addition, here, the cable 1 only needs to be opened over a relatively small length (see above) to gain access to the signal conductor 5. Further, the signal conductor can be taken out of the cable opening 9 obtained when it has already been fixed near a cable end face (for instance in a hand hole W).

According to an advantageous alternative method, the released conductor 5, which has not yet been pulled out over a desired length, cable inner space be coupled with a pull-out means, for instance a pulling wire, the cable opening K then being covered or closed in a suitable manner, such as by the Y-branch connector. The pulling means is then preferably still accessible from an environment for the purpose of operation. The pulling means can then still be used in a later stage to pull a part of the conductor 5 coupled therewith out of the cable 1, for instance when the respective end user wishes to be connected to the network.

Preferably, the cable configuration is such that a relatively long part 5 of the signal conductor, which is in the cable 1 and assumed an above-mentioned first position, is available to wholly or partly be brought to the second position to provide the extra length of the conductor part 5T to be taken out. Above-mentioned extra length is in particular extra conductor length stored in the cable (over a relatively large cable length) which is available to provide the conductor part 5T to be pulled out. This extra conductor length stored in the cable is at least equally large, or larger than, the desired length of the conductor part 5T to be taken out. The above-mentioned relatively long part is in particular much longer than the opening 9 provided locally, and preferably extends over a cable length of at least 10 meters, and in particular 100 meters or more (which of course depends on the length of the cable). In this manner, a very long conductor part 5T can be pulled out of the cable 1.

According to one embodiment, the relatively long part 5 of the signal conductor, which is in the cable 1 and is available (at least is pullable) to provide conductor length (intended for the conductor part 5T to be taken out), may have a length of at least 10 meters, in particular at least 100 m, and/or have, for instance, a length of the cable 1 (measured between cable end faces P1, P2). During use, this relatively long signal conductor part may move wholly or partly from an above-mentioned first position to an above-mentioned second position, if a take-out part 5T of the conductor is pulled out of the cable, depending on the desired length of the take-out part 5T.

Preferably, in this manner, cable conductor parts 5T with lengths of one or more meters can be taken out of the cable 1, in particular by pulling the respective cable conductor 5 in longitudinal direction, where a respective conductor part can move from an above-mentioned first position to an above-mentioned second position (and is, for instance, pulled out of a respective inner groove 8).

Preferably, for instance, a signal conductor take-out part 5T can be taken (pulled) out of the cable inner space 3, where at least a part of the cable inner space 3 contains the extra conductor length to provide above-mentioned conductor take-out part, where the extra conductor length is at least 1% of a length of the cable inner space part 3 containing this extra conductor length, preferably more than 2%, in particular more than 4% and more in particular more than 10% (for instance more than 15%). In particular, the length of the cable inner space part 3 containing the extra conductor length may be at least 10 m, in particular at least 100 m.

The signal conductor pull-out length can be increased further by using a relatively large cable diameter (so that a relatively large conductor spiral coil diameter follows in an above-mentioned first position) and when smaller bending radiuses of the conductor 5 are allowed. The pull-out length can increase rapidly when the diameter of the cable becomes similar to the bending radius of the conductor 5.

When a second (next) signal conductor is pulled out of the cable 1, for instance at another time, a part of this second signal conductor located in the inner space 3 can simply come next to the location of a signal conductor 5 already pulled to a second position (in particular in the case of an SZ-spiral structure), without this already pulled signal conductor 5 preventing the pulling of the second conductor. Different signal conductors brought into an above-mentioned second position may, for instance, extend at least partly substantially parallel with respect to one another in the cable 1.

By installing one or more cables according to the invention, a network can be constructed in a relatively reliable and efficient manner, with relatively inexpensive and compact cable means.

It will be readily apparent to a skilled person that the invention is not limited to the exemplary embodiments described. Various modifications are possible within the framework of the invention as described in the following claims.

Thus, an above-mentioned curved path of the part of the signal conductor located in the cable is preferably such that, in a first conductor position, the conductor can follow the path without being damaged thereby, being subject to breakage, leading to significant signal damping. To this end, the curved path may be provided with one or more (preferably a large number of) gradual bends or coils, viewed with respect to the cable longitudinal direction.

Further, the cable is preferably laid without extra envelope; this is not necessary, however. Thus, the cable may also, for instance, be armed, or be laid in one or more outer tubes or cable ducts.

Further, for instance, a bundle or assembly of several cables according to the invention may be provided, which bundle or assembly can be laid at the same time in a desired position.

Further, the invention may be used to prepare a cable assembly, for instance around one or more rolled cable trees. To this end, the wall of a cable according to the invention may, for instance, be opened in a factory at one or more desired, predetermined branch points. A desired signal conductor may then be reached through the opening thus obtained and, for instance, be cut. Optionally, the signal conductor parts thus made available may be provided with connecting means, for instance signal-transmitting plugs. Such connecting means may then, for instance, be stored in the cable by pushing them into the cable (through a respective above-mentioned opening in the cable wall). Then, the cable can be rolled on a roll, while above-mentioned branches are preferably provided with protective means, for instance a detachable cover. In addition, for instance, branch conductors be provided in the advance, and rolled together with the cable. The cable thus obtained, provided with one or more branches, can then be brought to a desired end location, e.g. to be part of a cable network.

The invention claimed is:

1. A cable, comprising:
a cylindrical cable wall surrounding a hollow, coreless cable inner space, the cable inner space comprising a set of grooves having inwardly facing openings, and
at least one signal conductor, comprising a glass fiber, wherein, in a first position, the at least one signal conductor extends substantially in a groove of the set of grooves of the hollow cable inner space and over a particular distance along the cylindrical cable wall, along an at least partly curved path, such that a length of the signal conductor is larger than a length of the cable wall,
wherein the at least one signal conductor is extendable to a second position, wherein the at least one signal conductor occupies a part of the coreless cable inner space outside the set of grooves and wherein while in the second position, a conductor part extending in the hollow cable inner space is shorter than a conductor part of the at least one signal conductor extending in the hollow cable inner space in the first position.

2. The cable according to claim 1, wherein the cable wall includes a structure on an inside to engage said at least one signal conductor when the at least one signal conductor is in the first position to substantially prevent tangential displacement of the signal conductor—viewed with respect to a cable centerline.

3. The cable according to claim 1, wherein the cable wall includes at least ten grooves to receive the part of the at least one signal conductor extending along the wall in said first position.

4. The cable according to claim 3, wherein each said groove extends along a spiral-shaped path, or along a path provided with one or more spiral-shaped path sections.

5. The cable according to claim 1, wherein the cable wall is arranged to be opened at a desired position to reach the signal conductor and partly take it out of the cable, wherein a length of the respective opening is smaller than a length of the conductor part to be taken out.

6. The cable according to claim 1, wherein at least a part of the signal conductor extends over a particular distance along a curved path in the first position, and extends along a less curved path in the second position.

7. The cable according to claim 1, wherein the conductor part brought to the second position is at least at a lateral distance from the position which this conductor part assumes in its first position, viewed in a cable cross section.

8. The cable according to claim 1, wherein the cable includes at least 10 of said at least one signal conductor.

9. The cable according to claim 1, wherein an inner diameter of the cylindrical cable wall is at least ten times a conductor cross dimension.

10. The cable according to claim 1, wherein the length of the signal conductor is at least 1% larger than a length of the cable wall.

11. The cable according to claim 1, wherein a minimum bending radius of a part of the signal conductor located in the cable is 20 mm.

12. The cable according to claim 1, wherein a conductor part with a length of at least 1 m can be pulled from the cable, and preferably with a length of at least 10 m, at a position at a distance from cable end faces.

13. The cable according to claim 1, further comprising marking means on an outside to mark a location of said cable conductor extending in the inner space.

14. The cable according to claim 1, wherein the cable comprises a tube filled with fluid.

15. The cable according to claim 1, wherein, in a first position, the signal conductors are positioned against the cable wall in a close stacking, in curved paths.

16. The cable according to claim 1, wherein a said conductor is at least partly movable away from the cable wall to the said second position, such that, in the second position, this conductor part is spatially separated from the cable wall.

17. The cable according to claim 1, wherein a part of the signal conductor extending over a particular distance along the cable wall in the respective first position completely abuts this cable wall in the respective first position, or extends at a distance of less than 1 mm from an inside of this cable wall in the respective first position.

18. The cable according to claim 15, with one or more ribs on the inside of the cable wall, in a SZ-stranded shape, wherein the closely stacked signal conductors forcedly follow the one or more ribs.

19. A cable network provided with at least one cable according to claim 1, wherein at least one said signal conductor of the cable forms a signal-transmitting connection between different network parts.

20. A use of a cable according to claim 1, wherein the difference in length between the signal conductor and the cable wall is used to take a part of the signal conductor out of the inner space of the cable, which part is then connected to signal-receiving and/or signal-transmitting means.

* * * * *

UNITED STATES PATENT AND TRADEMARK OFFICE
CERTIFICATE OF CORRECTION

PATENT NO.       : 8,374,471 B2
APPLICATION NO.  : 12/602060
DATED            : February 12, 2013
INVENTOR(S)      : Willem Griffioen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
First Day of September, 2015

Michelle K. Lee
*Director of the United States Patent and Trademark Office*